United States Patent
Park et al.

(10) Patent No.: US 10,960,734 B2
(45) Date of Patent: Mar. 30, 2021

(54) MOMENTARY AIR CONDITIONER FOR VEHICLE, VEHICLE INCLUDING THE SAME AND COOLING METHOD THEREBY

(71) Applicant: JEJU NATIONAL UNIVERSITY INDUSTRY-ACADEMIC COOPERATION FOUNDATION, Jeju-si (KR)

(72) Inventors: Youn Cheol Park, Jeju-si (KR); Won Gee Chun, Seoul (KR); Kim Choon Ng, Jeju-si (KR)

(73) Assignee: JEJU NATIONAL UNIVERSITY INDUSTRY-ACADEMIC COOPERATION FOUNDATION, Jeju-si (KR)

( * ) Notice: Subject to any disclaimer, the term of this patent is extended or adjusted under 35 U.S.C. 154(b) by 671 days.

(21) Appl. No.: 15/779,524

(22) PCT Filed: May 22, 2015

(86) PCT No.: PCT/KR2015/005218
§ 371 (c)(1),
(2) Date: May 27, 2018

(87) PCT Pub. No.: WO2015/178744
PCT Pub. Date: Nov. 26, 2015

(65) Prior Publication Data
US 2018/0361829 A1    Dec. 20, 2018

(30) Foreign Application Priority Data
May 22, 2014 (KR) .................. 10-2014-0061615

(51) Int. Cl.
*B60H 1/32* (2006.01)
*B60H 1/00* (2006.01)

(52) U.S. Cl.
CPC .......... *B60H 1/3219* (2013.01); *B60H 1/005* (2013.01); *B60H 1/00778* (2013.01);
(Continued)

(58) Field of Classification Search
CPC .... B60H 1/3219; B60H 1/3201; B60H 1/005; B60H 1/00735; B60H 1/00778; B60H 1/32011
See application file for complete search history.

(56) References Cited

U.S. PATENT DOCUMENTS

2004/0231833 A1* 11/2004 Wang .................. F25B 45/00
                                                         165/202
2009/0277202 A1* 11/2009 Viegas .................. B60H 3/024
                                                          62/236
2017/0045276 A1*  2/2017 Brauer .................. B60H 1/005

FOREIGN PATENT DOCUMENTS

JP   2003-175722 A   6/2003
JP   2011-220594 A   11/2011
(Continued)

OTHER PUBLICATIONS

International Search Report for PCT/KR2015/005218 dated Aug. 21, 2015 from Korean Intellectual Property Office.

*Primary Examiner* — Edward F Landrum
*Assistant Examiner* — Alexis K Cox
(74) *Attorney, Agent, or Firm* — Revolution IP, PLLC

(57) ABSTRACT

A vehicular cooling device includes: a main cooling system including a compressor, a condenser, a liquid receiver, an expansion valve, an evaporator, a first refrigerant flow line connecting the compressor and the condenser, a second refrigerant flow line connecting the condenser and the liquid receiver, a third refrigerant flow line connecting the liquid receiver and the expansion valve, a fourth refrigerant flow line connecting the expansion valve and the evaporator, and a fifth refrigerant flow line connecting the evaporator and the (Continued)

compressor; and a sub-cooling system for enabling the refrigerant to flow to including the liquid receiver, the third refrigerant flow line, the expansion valve, the fourth refrigerant flow line, the evaporator, and a pre-cooling means disposed between the evaporator and the compressor, an absorbent tank storing an absorbent and a sixth refrigerant flow line connecting the absorbent tank to the fifth refrigerant flow line.

4 Claims, 1 Drawing Sheet

(52) U.S. Cl.
CPC ............. *B60H 1/322* (2013.01); *B60H 1/323* (2013.01); *B60H 1/32011* (2019.05); *B60H 1/32281* (2019.05); *B60H 2001/3289* (2013.01)

(56) References Cited

FOREIGN PATENT DOCUMENTS

| | | |
|---|---|---|
| KR | 10-2009-0061995 A | 6/2009 |
| KR | 10-1125328 B1 | 3/2012 |

\* cited by examiner

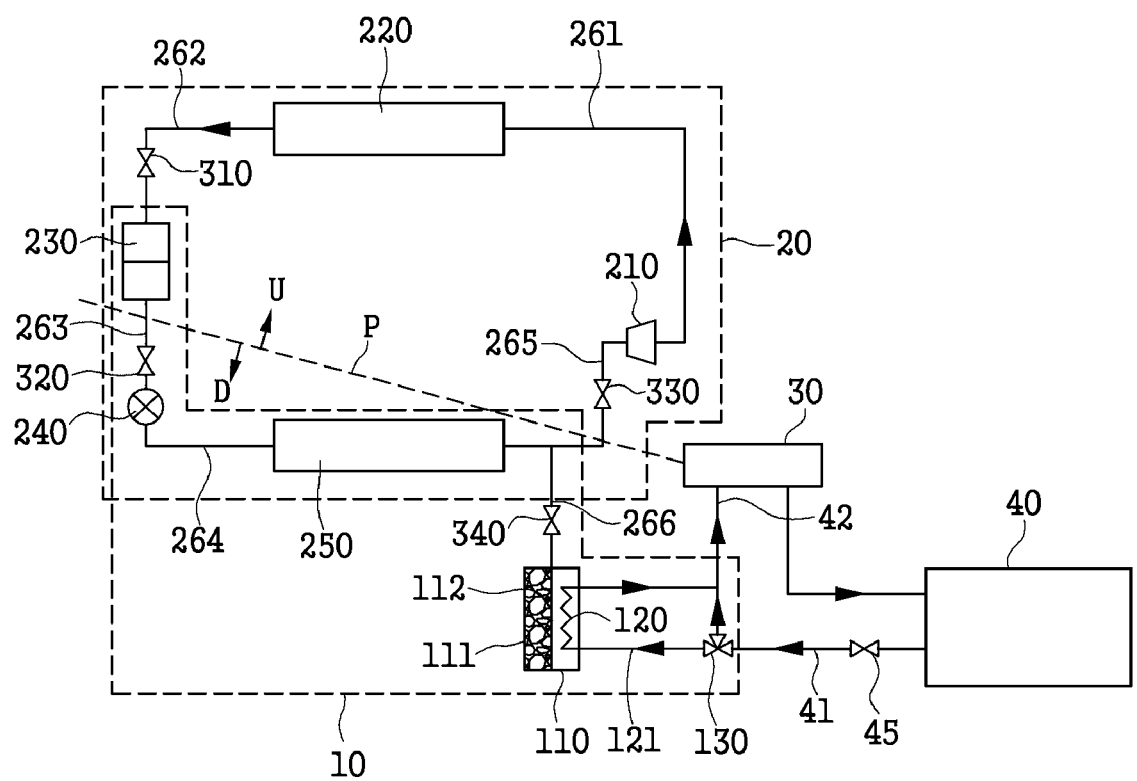

MOMENTARY AIR CONDITIONER FOR VEHICLE, VEHICLE INCLUDING THE SAME AND COOLING METHOD THEREBY

TECHNICAL FIELD

The present invention relates to a vehicular cooling device capable of instant cooling, a vehicle including the same, and an instant cooling method of the vehicle.

BACKGROUND

When a vehicle is parked for a long time in the summer, a temperature of an inside of the vehicle becomes high before driving due to high ambient temperature and exposure to direct solar radiation. At this time, the temperature of the inside of the vehicle generally rises to 50° C. Since the inside temperature of the vehicle is very high until a cooling device becomes a normal operation after the vehicle is started and travels, a driver and passengers in the vehicle feel discomfort. It takes 3 to 5 minutes for a conventional cooling device of the vehicle, i.e., an air conditioner to become the normal condition and to obtain cooling effect. During this time, a driver and passengers feel discomfort due to high temperature of the inside of the vehicle.

In addition, the air conditioner of the vehicle is generally operated by idling the engine before traveling, fuel is unnecessarily consumed and emission of exhaust gas may cause environmental pollution.

In order to solve such problems, patent document 1 among prior art documents discloses a conventional air-conditioning device before starting a vehicle. Since the conventional air-conditioning and heating device before starting can cool or warm up the vehicle before boarding or starting the vehicle, purpose of the conventional air-conditioning device before starting is similar to that of the present invention. However, the conventional air-conditioning and heating device before starting can assist to cool the vehicle by mounting a power supply, a control means, and an electric cooler at the vehicle. Therefore, configuration and function of the conventional air-conditioning device before starting differ from those of the present invention.

DETAILED DESCRIPTION OF THE INVENTION

Technical Object

The present invention has been made in an effort to provide a vehicular cooling device capable of instant cooling, a vehicle including the same, and an instant cooling method of the vehicle having advantages of improving driver's comfort, reducing fuel consumption due to unnecessary idling, reducing carbon dioxide emissions, and prevent environmental pollution as a consequence of cooling the vehicle in advance before initial starting of the vehicle or at parking state of the vehicle by connecting a pre-cooling means to an outlet of an evaporator and an inlet of a compressor in a cooling device of a vehicle. An absorbent tank is the pre-cooling means and is filled with an absorbent. The present invention is operated when the vehicle is not started and can instantly cool a cabin of the vehicle. However, described purpose of the present invention is exemplary and is not intended to limit the scope of the present invention.

Means for Achieving the Object

According to one aspect of the present invention, a vehicular cooling device capable of instant cooling includes a main cooling system including a compressor, a condenser, a liquid receiver, an expansion valve and an evaporator which are connected for circulating a refrigerant, and a sub-cooling system for enabling the refrigerant to flow to the liquid receiver, the expansion valve, the evaporator and a pre-cooling means disposed between the evaporator and the compressor, wherein the vehicular cooling device is capable of instantly cooling an inside of the vehicle by enabling the refrigerant not to circulate through a line of the main cooling system when the sub-cooling system operates, and enabling the refrigerant stored in the liquid receiver to flow to the pre-cooling means via the evaporator due to pressure difference between the liquid receiver and the pre-cooling means.

The vehicular cooling device capable of instant cooling may further include a first valve mounted between the condenser and the liquid receiver, a second valve mounted between the liquid receiver and the expansion valve, a third valve mounted between the evaporator and the compressor and a fourth valve mounted on a refrigerant flow line between the evaporator and the compressor, wherein the pre-cooling means is connected to the refrigerant flow line, the first valve to the third valve are closed when operation of the main cooling system is stopped, and the second valve and the fourth valve are open when the sub-cooling system is operated.

The pre-cooling means may include an absorbent tank in which an absorbent is stored, and the absorbent may be any one of a silica gel, an activated carbon, a graphite and a combination thereof.

A three-way valve may be configured to connect a refrigerant flow line between a radiator of the vehicle and an engine or between the radiator and a stack to a coolant supply line of the pre-cooling means in order to receive a high-temperature coolant and may be configured to connect the pre-cooling means to a coolant exhaust line to discharge the supplied coolant.

The vehicular cooling device capable of instant cooling may further include an operating means which operates the sub-cooling system for instant cooling, wherein the operating means is an operation button, an operation switch or a remote control.

An amount of the refrigerant filling in the liquid receiver may be larger than an appropriate filling amount of an air conditioner of the vehicle to be capable of cooling for a predetermined time when the sub-cooling system is operated.

The sub-cooling system may further include a heater heating the absorbent.

Meanwhile, according to another aspect of the present invention, a vehicle includes a vehicle body and the aforementioned cooling device which is mounted at the vehicle body.

Meanwhile, according to other aspect of the present invention, an instant cooling method of a vehicular cooling device which is connectedly mounted to a cooling device of a vehicle comprising a compressor, a condenser, a liquid receiver, an expansion valve, an evaporator, a first valve between the condenser and the liquid receiver, a second valve between the liquid receiver and the expansion valve, and a third valve between the evaporator and the compressor is provided. The instant cooling method may include operating an operating means of an instant cooling device in a state that the vehicle is not started and the first and third valves are closed, and performing an instant cooling by flowing a refrigerant stored in the liquid receiver to an absorbent tank through the evaporator due to pressure difference between the absorbent tank and the liquid receiver connected through a fourth valve between the and the compressor opened by operation of the operating means.

The instant cooling method may further include operating the cooling device of the vehicle by closing the fourth valve of the absorbent tank and opening the first to the third valves connected to the compressor or the evaporator of the cooling device of the vehicle after a delay time has passed since the instant cooling was performed for a predetermined time and the pressure difference of the refrigerant vanished.

The instant cooling method may further include supplying the high-temperature coolant of a vehicle engine or a stack to the absorbent tank in order to desorb the refrigerant by regeneration of a silica gel stored in the absorbent tank when the cooling device of the vehicle is operated, and closing the fourth valve of the absorbent tank and supplying the high-temperature coolant which was supplied to the absorbent tank to a radiator of the vehicle when desorption of the refrigerant is completed.

Effect of the Invention

The vehicular cooling device capable instant cooling, the vehicle including the same, and the instant cooling method of the vehicle according to the exemplary embodiments of the present invention can improve driver's comfort without causing unpleasant feeling of the driver and occupants due to high temperature of the inside of the vehicle by performing instant cooling until the cooling device normally operates prior to starting of the vehicle.

In addition, the present invention can reduce fuel consumption due to unnecessary idling by operation of the cooling device since the cooling device is not required operate prior to the starting of the vehicle. Therefore, carbon dioxide emissions can be reduced and environmental pollutions can be prevented.

BRIEF DESCRIPTION OF THE DRAWINGS

FIG. 1 is a schematic diagram of a vehicular instant cooling device of the present invention.

| | |
|---|---|
| 10: instant cooling system | 20: main cooling system |
| 110: pre-cooling means | 111: absorbent tank |
| 112: absorbent | 120: heating pipe |
| 130: three-way valve | 210: compressor |
| 220: condenser | 230: liquid receiver |
| 240: expansion valve | 250: evaporator |

FORMS FOR EXECUTING THE INVENTION

Hereinafter, a vehicular cooling device capable of instant cooling, a vehicle including the same, and an instant cooling method of the vehicle according to exemplary embodiments of the present invention will be described in detail with reference to the accompanying drawings. The present invention is not limited to the exemplary embodiments that will hereinafter be described but is achieved in various forms. Instead, the present exemplary embodiments is intended to inform a person of skill in the art of a scope of the present invention to complete disclosure of the present invention.

FIG. 1 is a schematic diagram of a vehicular instant cooling device of the present invention. A vehicular cooling device capable of instant cooling includes a main cooling system and a sub-cooling system.

As shown in FIG. 1, the main cooling system includes an evaporator 250, a compressor 210, a condenser 220, a liquid receiver 230 and an expansion valve 240 which are connected for circulating a refrigerant.

The sub-cooling system 10 includes the liquid receiver 230, the expansion valve 240, the evaporator 250 and a pre-cooling means 110 disposed between the evaporator and the compressor. The refrigerant can flow through the liquid receiver 230, the expansion valve 240, the evaporator 250 and the pre-cooling means 110 disposed between the evaporator and the compressor.

In detail, the sub-cooling system 10 includes the pre-cooling means 110 such as an absorbent tank 111 that is connected to a fifth refrigerant flow line 265 between the evaporator 250 and the compressor 210 of the main cooling system 20 through a valve 340.

That is, the sub-cooling system 10 shares the liquid receiver 230, the expansion valve 240 and the evaporator 250 with the main cooling system 20. In addition, the sub-cooling system 10 shares a portion of the refrigerant flow line with the main cooling system 20.

That is, the main cooling system 20 includes a first refrigerant flow line 261, a second refrigerant flow line 262, a third refrigerant flow line 263, a fourth refrigerant flow line 264, the fifth refrigerant flow line 265 and a sixth refrigerant flow line 266, through which the refrigerant flows in a sequence of the evaporator 250, the compressor 210, the condenser 220, the liquid receiver 230 and the expansion valve 240. A first valve 310 is mounted on the second refrigerant flow line 262 between an outlet of the condenser 220 and an inlet of the liquid receiver 230, a second valve 320 is mounted on the third refrigerant flow line 263 between an outlet of the liquid receiver 230 and an inlet of the expansion valve 240, and a third valve 330 is mounted on the fifth refrigerant flow line 265 between an outlet of the evaporator 250 and an inlet of the compressor 210.

The sub-cooling system 10 includes the sixth refrigerant flow line 266 connected to the fifth refrigerant flow line 265 between the outlet of the evaporator 250 and the third valve 330 of the main cooling system 20. The absorbent tank 111 in which an absorbent 112 such as a porous silica gel is filled is mounted on the sixth refrigerant flow line 266. A fourth valve 340 is mounted on the sixth refrigerant flow line 266.

Herein, the porous silica gel is the absorbent 112 and is configured to absorb the gaseous refrigerant evaporated after passing through the liquid receiver 230 and the expansion valve 240 and is stored in the absorbent tank 111. A porous activated carbon or a porous graphite as well as the silica gel may be used as the absorbent.

The sub-cooling system according to the exemplary embodiment of the present invention is capable of desorbing the gaseous refrigerant which was absorbed in the absorbent (porous silica gel) of the absorbent tank 111 and transmitting the desorbed refrigerant to the compressor 210 when the vehicular cooling device normally operates. That is, the sub-cooling system prepares next instant cooling by desorbing the refrigerant from the silica gel of the silica gel). Since the silica gel of the absorbent desorbs the absorbed gaseous refrigerant when the absorbent is supplied with heat, waste heat of an engine 40 and a radiator 30, as shown in FIG. 1, are used to supply heat in a case of an internal combustion engine using a fossil fuel, and a stack generating electric power and a radiator are used to supply heat in a case of a fuel cell vehicle using a hydrogen battery.

In a case that the waste heat of the engine 40 is used to desorb the gaseous refrigerant absorbed at the absorbent of the absorbent tank 111, the engine 40 is connected to the absorbent tank 111 to supply the high-temperature coolant to the absorbent tank 111. After the coolant for cooling the engine becomes the high-temperature coolant at the engine, the high-temperature coolant flows to the radiator 30 and is cooled through a bellows valve 45 and a coolant flow line 41 connecting the engine 40 and the radiator 30. A three-way valve 130 is mounted between the coolant flow line 41 and the absorbent tank 111 such that the coolant flow line 41 is connected to an inlet of the coolant supply line 121 and the coolant exhaust line 42 is connected to an outlet of the absorbent tank 111. In a case of the vehicle using a battery such as a hydrogen battery, the engine is substituted with a stack.

An instant cooling method of the vehicle by the vehicular cooling device capable of instant cooling according to the present invention will be described.

If the main cooling system 20 is operated, the compressor 210 is operated to transmit the high-temperature/high-pressure gaseous refrigerant to the condenser 220. The high-temperature/high-pressure gaseous refrigerant supplied from the compressor 210 is changed into the high-temperature/high-pressure liquid refrigerant at the condenser 220. The high-temperature/high-pressure liquid refrigerant is gathered in the liquid receiver 230 and becomes the low-temperature/low-pressure liquid refrigerant by wire drawing effect at the expansion valve 240. The low-temperature/low-pressure liquid refrigerant is supplied to the evaporator 250 and the evaporator 250 drops a temperature of an inside of the vehicle. This is called a normal cooling of the vehicle.

The sub-cooling system 10 may be performed when ignition of the vehicle is stopped or at a parked state where the ignition is stopped. If the ignition of the vehicle is stopped, the first to the fourth valves 310 to 340 are closed. In this case, a portion including the condenser 220, the compressor 210 and the expansion valve 240 above a dotted line P between the second refrigerant flow line 262 and the fifth refrigerant flow line 265 becomes high-pressure state, and a portion under the dotted line P becomes low-pressure state. At this time, the liquid refrigerant supplied from the condenser 220 during operation of the cooling device is stored in the liquid receiver 230.

The sub-cooling system 10 uses the liquid refrigerant stored in the liquid receiver 230. If the driver operates the sub-cooling system 10 using an operating means such as an operation button, an operation switch, or a remote control before starting the vehicle, the second valve 320 and the fourth valve 340 are open.

In this case, a pressure difference between the liquid receiver 230 and the absorbent tank 111 being the pre-cooling means 110 is generated, and the refrigerant flows from the liquid receiver 230 toward the absorbent tank 111. At this time, the liquid refrigerant discharged from the liquid receiver 230 flows to the expansion valve 240. The expansion valve 240 changes the high-pressure liquid refrigerant into the low-temperature liquid refrigerant and supplies the low-temperature liquid refrigerant to the evaporator 250. The evaporator 250 instantly cools the inside of the vehicle through heat exchange with the air and the refrigerant. The gaseous refrigerant evaporated through the heat-exchange is stored in the absorbent tank 111 in which the absorbent including the porous silica gel is stored.

According to the present invention, the refrigerant flows from the liquid receiver 230 to the evaporator 250 due to the pressure difference therebetween at an initial stage. However, after the pressure difference vanishes, the refrigerant continuously flows to the evaporator 250 through Siphon effect and the gaseous refrigerant discharged from the evaporator 250 is absorbed at the porous silica gel of the absorbent 112 in the absorbent tank 111.

For example, when the vehicle begins to drive and the main cooling system 20 is operated, the refrigerant in high-pressure state is stored in the liquid receiver 230. As time goes on, the vehicle is heated by surroundings and becomes high-temperature state where the driver feels displeasure feeling.

At this time, the driver operates the sub-cooling system 10 using the operating means before starting the vehicle. If the sub-cooling system 10 is operated, the second valve 320 and the fourth valve 340 are open such that the refrigerant flows from the liquid receiver 230 to the absorbent tank 111 that is the pre-cooling means 110. The refrigerant absorbs heat of the inside of the vehicle while passing through the evaporator 250.

Herein, the operating means may be the operation button, the operation switch or the remote control. For example, the operation button may be an additional button for operating the sub-cooling system 10 which is provided in the inside of the vehicle. The operation switch may be a switch mounted on a remote control key of the vehicle. In addition, the remote control may be an additional remote control device other than the remote control key.

According to the present invention, an additional refrigerant for instant cooling can be added to the refrigerant suitable for an air conditioner of the vehicle. In detail, an amount of the additional refrigerant is an amount by which the instant cooling device operates for 5 to 10 minutes. Therefore, the additional refrigerant is added to the liquid receiver 230 of the air conditioner to be capable of instant cooling, and the amount of the refrigerant filling in the liquid receiver 230 is larger than an appropriate filling amount of the air conditioner of the vehicle.

If the pressure difference vanishes and the absorbent 112 of the absorbent tank 111 does not absorb the refrigerant any more after 5 to 10 minutes have passed since the sub-cooling system 10 was operated, the fourth valve 340 connected to the absorbent tank 111 is closed and the first to the third valves 310 to 330 are open such that the cooling device is operated normally by using the main cooling system 20.

If the vehicle is started or the driver operates the main cooling system 20 even though the sub-cooling system 10 is operated, the sub-cooling system 10 can be stopped.

During the main cooling system 20 is operated, the silica gel of the absorbent needs to be regenerated (that is, the refrigerant needs to be desorbed from the silica gel) in order to use the refrigerant of the absorbent tank for next instant cooling after the vehicle is stopped. The refrigerant can be desorbed from the silica gel if the silica gel is heated.

At this time, the necessary heat is supplied by the coolant of the engine. After the of the engine 40 cools the engine 40, the coolant of the engine 40 becomes a high-temperature state above a predetermined temperature. In case, the bellows valve 45 mounted on the coolant flow line 41 is open for the high-temperature coolant to be supplied to the radiator 30 through the coolant flow line 41. The high-temperature coolant is cooled by a fresh air and is changed to a low-temperature coolant. The low-temperature coolant is supplied back to the engine 40. The sub-cooling system 10 supplies the high-temperature coolant supplied to the radiator 30 through the bellows valve 45 preferentially to the absorbent tank 111 using the three-way valve 130. In this case, the silica gel is heated and the refrigerant absorbed at the silica gel is desorbed. After the desorption is completed, the fourth valve 340 is closed and the three-way valve 130 supplies the high-temperature coolant to the radiator 30 of the vehicle such that the cooling system of the engine 40 operates normally. During desorption, the compressor 210 simultaneously receives the refrigerant from the evaporator 250 and the absorbent tank 111. The same amount of the refrigerant as the desorption amount of the refrigerant from the absorbent tank 111 is stored in the liquid receiver 230 in a liquid state by control of the expansion valve 240. The refrigerant required to operate the main cooling system 20 circulates through the evaporator 250, the compressor 210 and the condenser 220 by the expansion valve 240.

Herein, a pump for flowing the refrigerant from the absorbent tank 111 to the compressor 210 may be mounted on the sixth refrigerant flow line 266.

Operation of the fourth valve 340 for flowing the gaseous refrigerant from the absorbent tank 111 to the compressor 210 is performed by pressure of the absorbent tank 111. If the pressure of the absorbent tank 111 is higher than a predetermined pressure, it is determined that the refrigerant is desorbed completely and the fourth valve 340 connected to the absorbent tank 111 is closed. Thereby, cooling of the vehicle is operated normally.

Meanwhile, according to another exemplary embodiment of the present invention, the vehicle may include a vehicle body and the aforementioned vehicular cooling device which is mounted at the vehicle body.

While the vehicular cooling device capable of instant cooling, the vehicle including the same and the instant cooling method of the vehicle according to the exemplary embodiments of the present invention are disclosed with reference to the accompanying drawings, it is to be understood that the invention is not limited to the disclosed embodiments, but, on the contrary, is intended to cover various modifications and equivalent arrangements included within the spirit and scope of the appended claims.

The invention claimed is:

1. A vehicular cooling device, comprising:
    a main cooling system including a compressor, a condenser, a liquid receiver, an expansion valve, an evaporator, a first refrigerant flow line connecting the compressor and the condenser, a second refrigerant flow line connecting the condenser and the liquid receiver, a third refrigerant flow line connecting the liquid receiver and the expansion valve, a fourth refrigerant flow line connecting the expansion valve and the evaporator, and a fifth refrigerant flow line connecting the evaporator and the compressor;
    a sub-cooling system including the liquid receiver, the third refrigerant flow line, the expansion valve, the fourth refrigerant flow line, the evaporator, an absorbent tank storing an absorbent and a sixth refrigerant flow line connecting the absorbent tank to the fifth refrigerant flow line; and
    a first valve mounted on the second refrigerant flow line, a second valve mounted on the third refrigerant flow line, a third valve mounted on the fifth refrigerant flow line and a fourth valve mounted on the sixth refrigerant flow line,
    wherein the vehicular cooling device is configured such that, when the sub-cooling system operates, the refrigerant stored in the liquid receiver flows to the absorbent tank via the evaporator due to pressure difference between the liquid receiver and the absorbent tank,
    wherein the vehicular cooling device is configured such that, when the sub-cooling system operates, the first valve and the third valve are closed and the second valve and the fourth valve are open.

2. The vehicular cooling device of claim 1, further comprising a coolant flow line through which high-temperature coolant flows, the coolant flow line connecting an engine and a radiator of the vehicle,
    wherein the sub-cooling system further comprises a coolant supply line connected to the coolant flow line and passing through an inside of the absorbent tank to heat the absorbent stored in the absorbent tank.

3. The vehicular cooling device of claim 1, further comprising an operating means configured to operate the sub-cooling system,
    wherein the operating means is an operation button, an operation switch or a remote control.

4. A vehicle comprising a vehicle body and the cooling device of claim 1 which is mounted at the vehicle body.

\* \* \* \* \*